Figure 1:
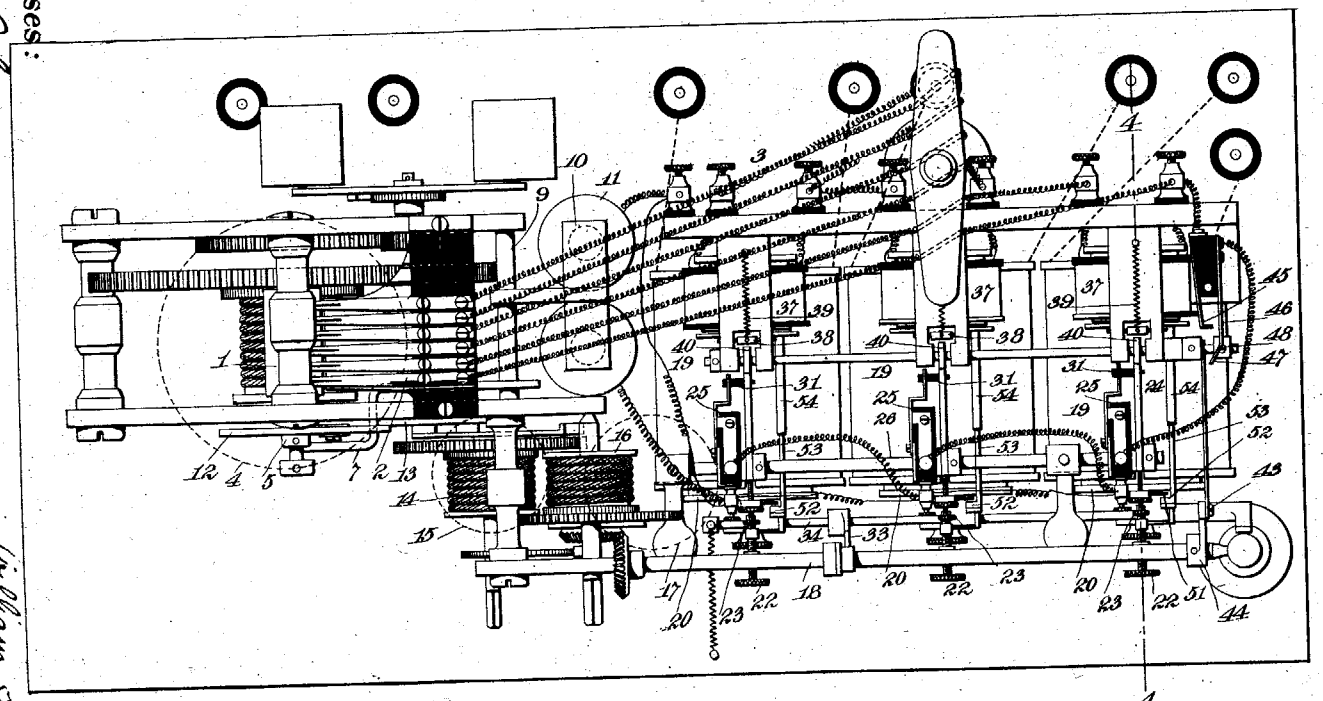

No. 12,364. REISSUED JUNE 20, 1905.

W. H. KIRNAN.

AUTOMATIC NON-INTERFERING REPEATER FOR FIRE ALARM CIRCUITS.

APPLICATION FILED MAY 4, 1904.

6 SHEETS—SHEET 1.

Witnesses:

Jas. F. Coleman

John L. Polsch

Inventor

William H. Kirnan,

By Dyer & Dyer

Attorneys.

No. 12,364. REISSUED JUNE 20, 1905.

W. H. KIRNAN.

AUTOMATIC NON-INTERFERING REPEATER FOR FIRE ALARM CIRCUITS.

APPLICATION FILED MAY 4, 1904.

5 SHEETS—SHEET 2.

Witnesses:

Jas. F. Coleman

John J. Potsch

Inventor

William H. Kirnan

By Dyer & Dyer

Attorneys.

No. 12,364. REISSUED JUNE 20, 1905.

W. H. KIRNAN.

AUTOMATIC NON-INTERFERING REPEATER FOR FIRE ALARM CIRCUITS.

APPLICATION FILED MAY 4, 1904.

6 SHEETS—SHEET 3.

Witnesses:

Jas. F. Coleman

John Lotsch

Inventor

William H. Kirnan

By Dyer & Dyer

Attorneys.

No. 12,364. REISSUED JUNE 20, 1905.

W. H. KIRNAN.

AUTOMATIC NON-INTERFERING REPEATER FOR FIRE ALARM CIRCUITS.

APPLICATION FILED MAY 4, 1904.

5 SHEETS—SHEET 4.

Witnesses:

Jas. F. Coleman

John S. Lotich

Inventor

William H. Kirnan

By Dyer & Dyer

Attorneys.

No. 12,364. REISSUED JUNE 20, 1905.

W. H. KIRNAN.

AUTOMATIC NON-INTERFERING REPEATER FOR FIRE ALARM CIRCUITS.

APPLICATION FILED MAY 4, 1904.

5 SHEETS—SHEET 5.

Witnesses:

Jas. F. Coleman

John L. Dotch

Inventor

William H. Kirnan

By Dyer & Dyer

Attorneys.

No. 12,364. Reissued June 20, 1905.

UNITED STATES PATENT OFFICE.

WILLIAM H. KIRNAN, OF BAYONNE, NEW JERSEY, ASSIGNOR TO THE GAMEWELL FIRE ALARM TELEGRAPH COMPANY, OF NEW YORK, N. Y., A CORPORATION OF NEW YORK.

AUTOMATIC NON-INTERFERING REPEATER FOR FIRE-ALARM CIRCUITS.

SPECIFICATION forming part of Reissued Letters Patent No. 12,364, dated June 20, 1905.

Original No. 749,387, dated January 12, 1904. Application for reissue filed May 4, 1904. Serial No. 206,417.

*To all whom it may concern:*

Be it known that I, WILLIAM H. KIRNAN, a citizen of the United States, residing at Bayonne, in the county of Hudson and State of New Jersey, have invented a certain new and useful Improvement in Automatic Non-Interfering Repeaters for Fire-Alarm Circuits, of which the following is a description.

My invention relates to repeaters for fire-alarm circuits; and my objects are to provide improvements therein by which interference in the transmission of signals from different street-circuits is prevented and also to provide for improvements by which the disabling of one or more street-circuits will not prevent the effective operation of the repeater from other street-circuits.

At the present time in the installation of fire-alarm apparatus the several street-circuits lead to a so-called "repeater," by means of which the signals are relayed or distributed over one or more joker-circuits leading to the several engine-houses and also ordinarily to the main whistle or bell. The employment of non-interfering street-boxes prevents confusion on any particular street-circuit by the concurrent operation of more than one street-box in that circuit even if a number of street-boxes are pulled simultaneously and results in the successive transmission of signals to the repeater from the several boxes which have thus been operated. With repeaters as so far developed, however, no adequate provision has been made for the prevention of confusion in the transmission of signals over the joker-circuits when signals on a plurality of street-circuits interfere. My principal object, therefore, is to so improve the construction and operation of repeaters that they shall possess all the attributes of the most highly developed street-boxes—namely, to prevent interference of signals transmitted concurrently from a plurality of street-circuits even when the interference is such that a signal from two or more street-boxes may be received at the repeater at the same instant of time.

Ordinarily the street-circuits are normally closed on the repeater and the transmission of signals is effected by successively breaking the street-circuits in the desired sequence. Since the non-interference mechanism which I prefer to employ is operated concurrently with the breaking of any one or more of the street-circuits, it will be obvious that a permanent disabling of a street-circuit, as by a ground or break therein, would result in confusion in the operation of the other circuits. A secondary object of the invention, therefore, is to provide improvements by reason of which the disabling of any street-circuit will not affect the proper and non-interfering operation of the repeater from the other street-circuits.

In carrying the invention into effect I employ a repeater having, preferably, the ordinary joker transmitting apparatus and operate the mechanism thereof by a main operating-magnet, which in the preferred instance is in a normally open local circuit. Each street-circuit leads to a street-magnet and is preferably normally closed. The release of the armature of any street-magnet by the breaking of one of the street-circuits operates a circuit-breaker, which closes the local circuit on the main operating-magnet and results in the operation of the joker-transmitter, which therefore repeats the signal over the engine-house circuit or circuits. A number of non-interference magnets are employed corresponding with the street-magnets, and these non-interference magnets are preferably also located in a normally open local circuit, which, however, is mechanically closed at the commencement of the operation of the repeating apparatus. The circuit-closing devices for closing the circuit to the main operating-magnet when in their normal position close a corresponding series of breaks in the non-interference circuit, and these circuit-closing devices cooperate with the armatures of the non-interference magnets, whereby when such armatures are retracted the circuit-closing devices corresponding to the same will be locked against operation, while, on the other hand, when any one of the circuit-closing devices is operated to close the circuit to the main operating-magnet the corresponding armature of the non-interference magnet will be held from moving to a retracted position. I make use of mechanical restoring devices for restoring the armatures of the street-magnets and non-interference magnets at the end of the operation of the repeating mechanism and for releasing such armatures at the commencement of that operation. With an apparatus having these characteristics, the details of which will be more fully hereinafter described, interference in the operation of the repeater is absolutely prevented, while at the same time successive operation of relatively concurrent signals received over a plurality of street-circuits is automatically effected.

In order that the invention may be better understood, attention is directed to the accompanying drawings, forming part of this specification, and in which—

Figure 2:
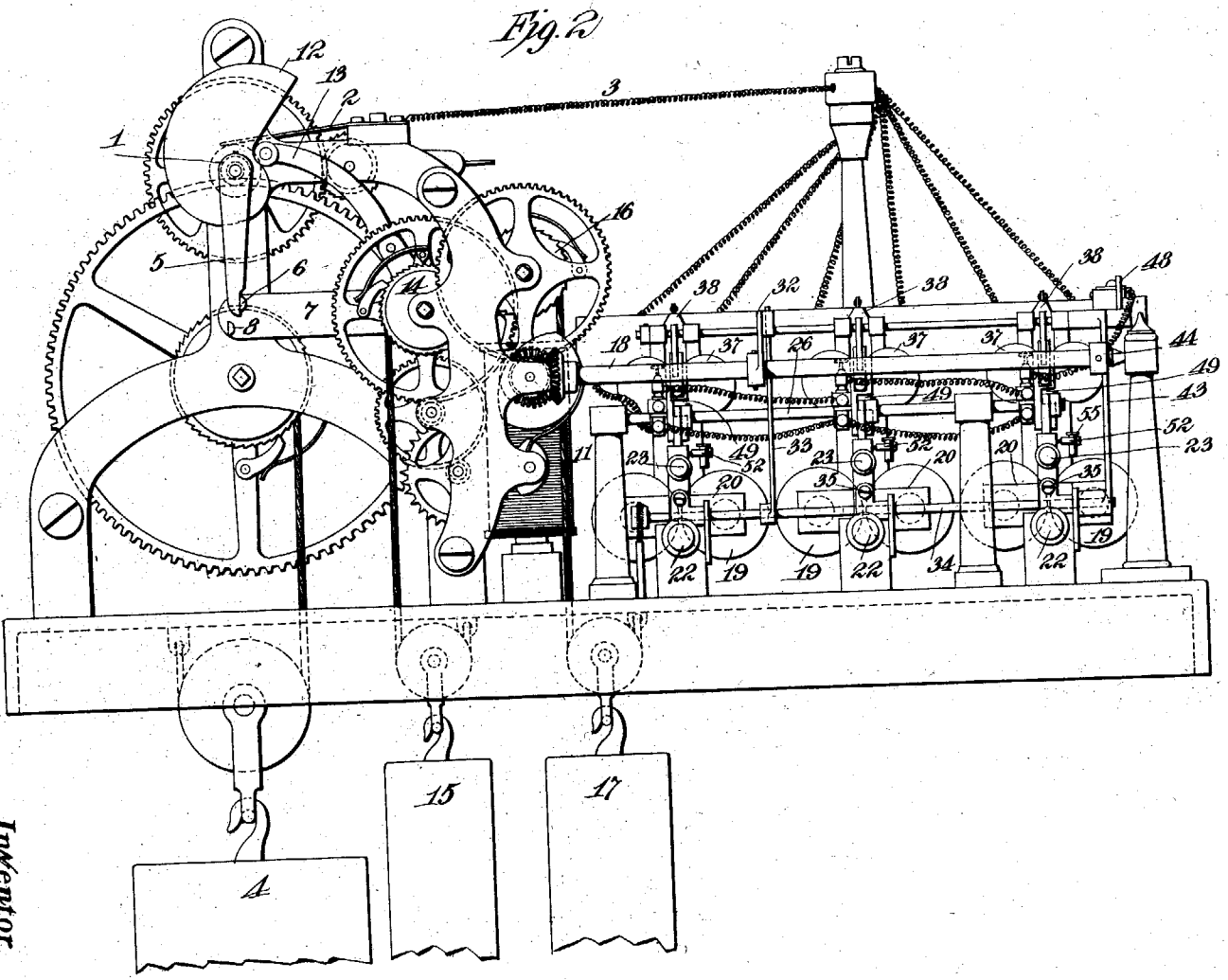
Figure 3:
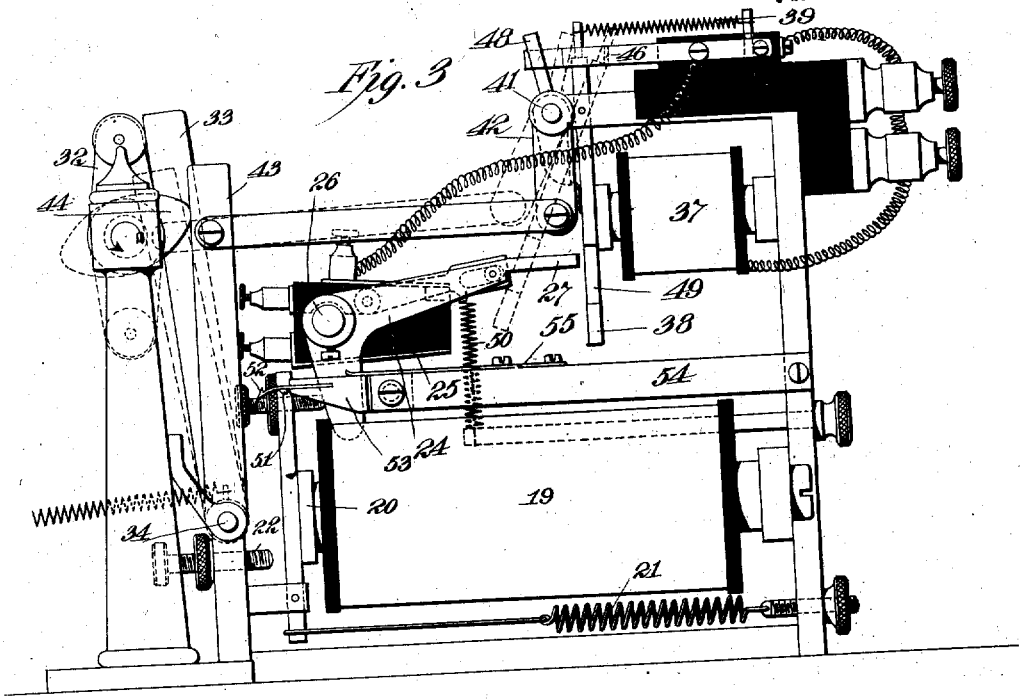
Figure 4:
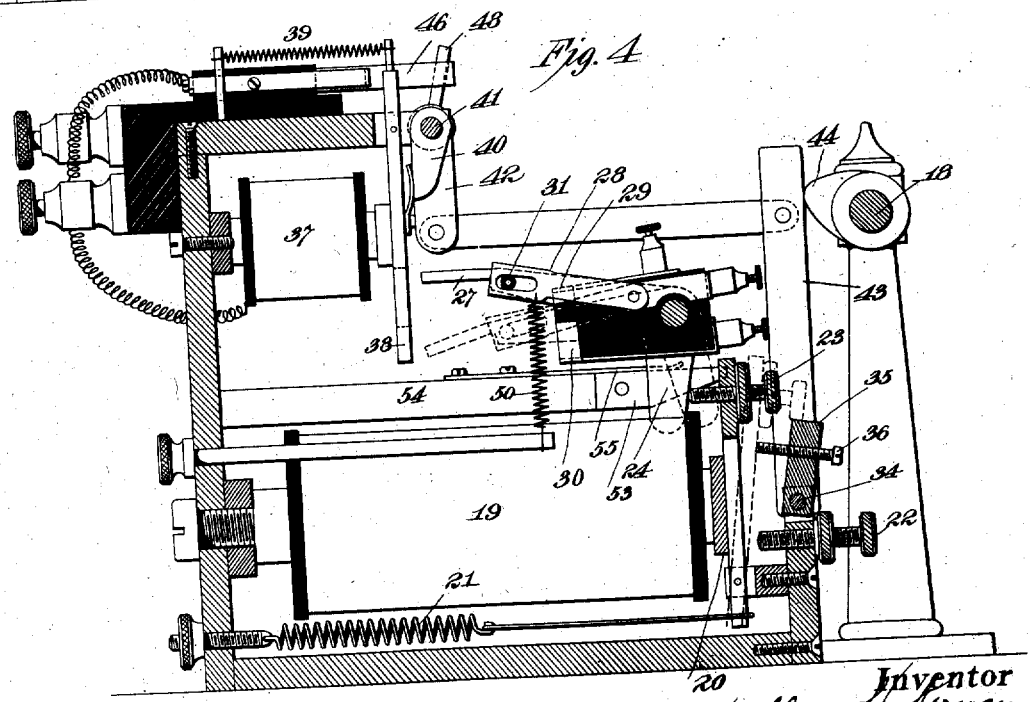
Figure 5:
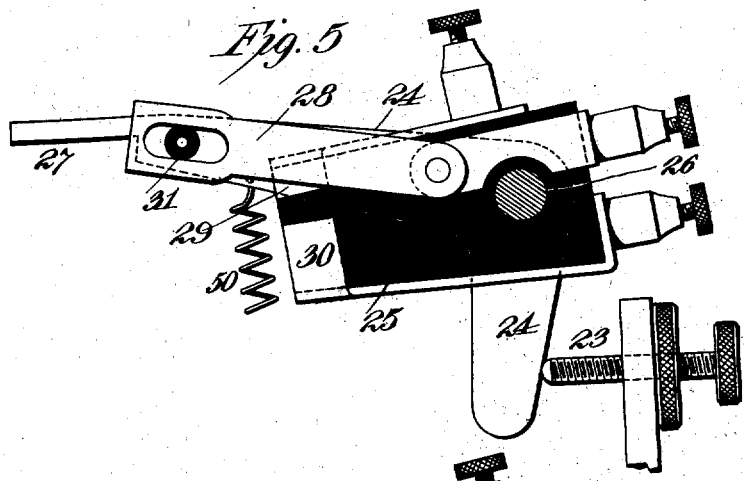
Figure 6:
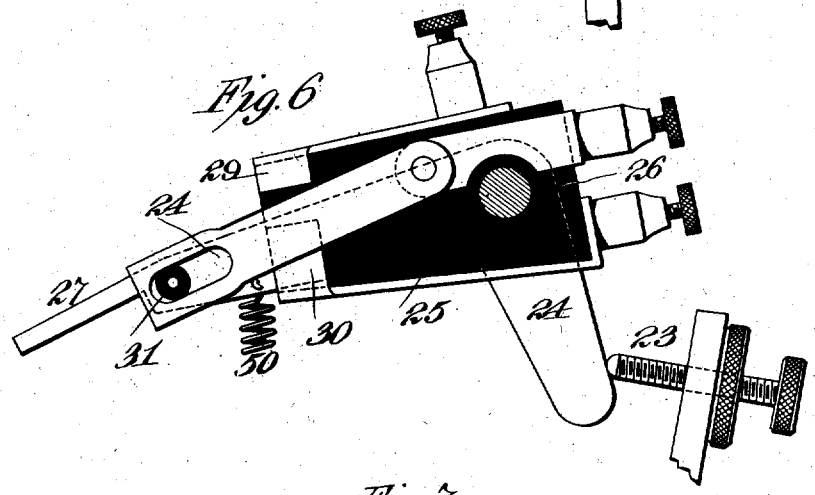
Figure 7:
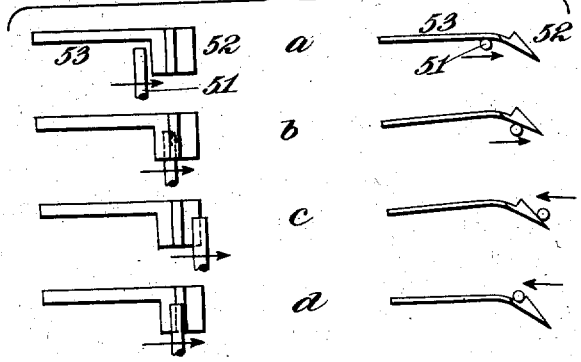

Figure 1 is a plan view of a well-known form of repeater with my present improvements applied thereto; Fig. 2, a side elevation; Fig. 3, an end view; Fig. 4, a section on the line 4 4 of Fig. 1; Figs. 5 and 6, enlarged detail views illustrating one of the switches and the parts immediately coöperating therewith in the normal and retracted positions of the armature of the corresponding street-magnet; Fig. 7, detail views illustrating one of the pins on the several street-magnet armature-levers and the hook with which it coöperates and showing the different positions of these parts in the operation of the device, and Fig. 8 a diagram illustrating the several circuits.

In all of the above views corresponding parts are represented by the same numerals of reference.

The general construction of repeaters of the type shown in the drawings is so well known that a detailed description and illustration of the same are not necessary. The repeater comprises an insulated cylinder 1, having contact-plates thereon which normally engage with contact-springs 2 in circuits 3 3, leading to the several engine-houses. All of these circuits will therefore be simultaneously broken when the cylinder 1 makes a complete rotation. The cylinder 1 is driven by a suitable gearing from a weight 4, thus constituting a repeating-train. Carried on the shaft of the cylinder 1 is an arm 5, provided on its lower end with a pin, which normally engages a stud 6 on an operating-lever 7. When this operating-lever is elevated, the arm 5 is released and rotates until the pin on its end engages a stud 8 on the lever 7, again closing the circuits 3. The return of the lever 7 to its normal position results in the reëngagement of the pin on the lower end of the arm 5 with the stud 6, so that the parts once again occupy their normal positions. The lever 7 is carried on a shaft 9, to which an armature 10 is connected. This armature is attracted by the main operating-magnet 11. Obviously when the circuit to the magnet 11 is closed and broken the cylinder 1 of the repeating mechanism will make a complete rotation. The shaft of the cylinder 1 is provided with the usual cam 12 for operating a trip-lever 13, the latter being frictionally connected with a winding-drum 14, operated by a weight 15. When the trip-lever 13 is moved upwardly by the cam 12, it trips a drum 16, operated by a weight 17, and by means of an escapement (not shown) permits the said drum to make a half-rotation, thus constituting a timing device. The trip-lever 13 is slowly returned toward its normal position by the operation of the weight 15, and when its normal position is reached the escapement mechanism for the drum 16 again operates and allows the latter to return to its normal position. The drum 16 is connected by a suitable gearing with the shaft 18, which effects the release and restoration of the several armatures, to be presently described. The construction and operation of the repeater which I have so far briefly outlined are well known to those skilled in the art. Repeaters of this type are described and illustrated in patents to Rogers and Crane, No. 223,248, of January 6, 1880; to Skelton, No. 596,250, of December 28, 1897, and to Kirnan, No. 650,358, of May 22, 1900, and differ from my repeater as so far described only in the single respect that with the previous devices trip-lever 7 has been operated by a rock-shaft, (see, for example, the rock-shaft 10 and link 11 of the Kirnan patent last referred to,) whereas with my repeater the trip-lever is operated by the magnet 11.

Figure 8:
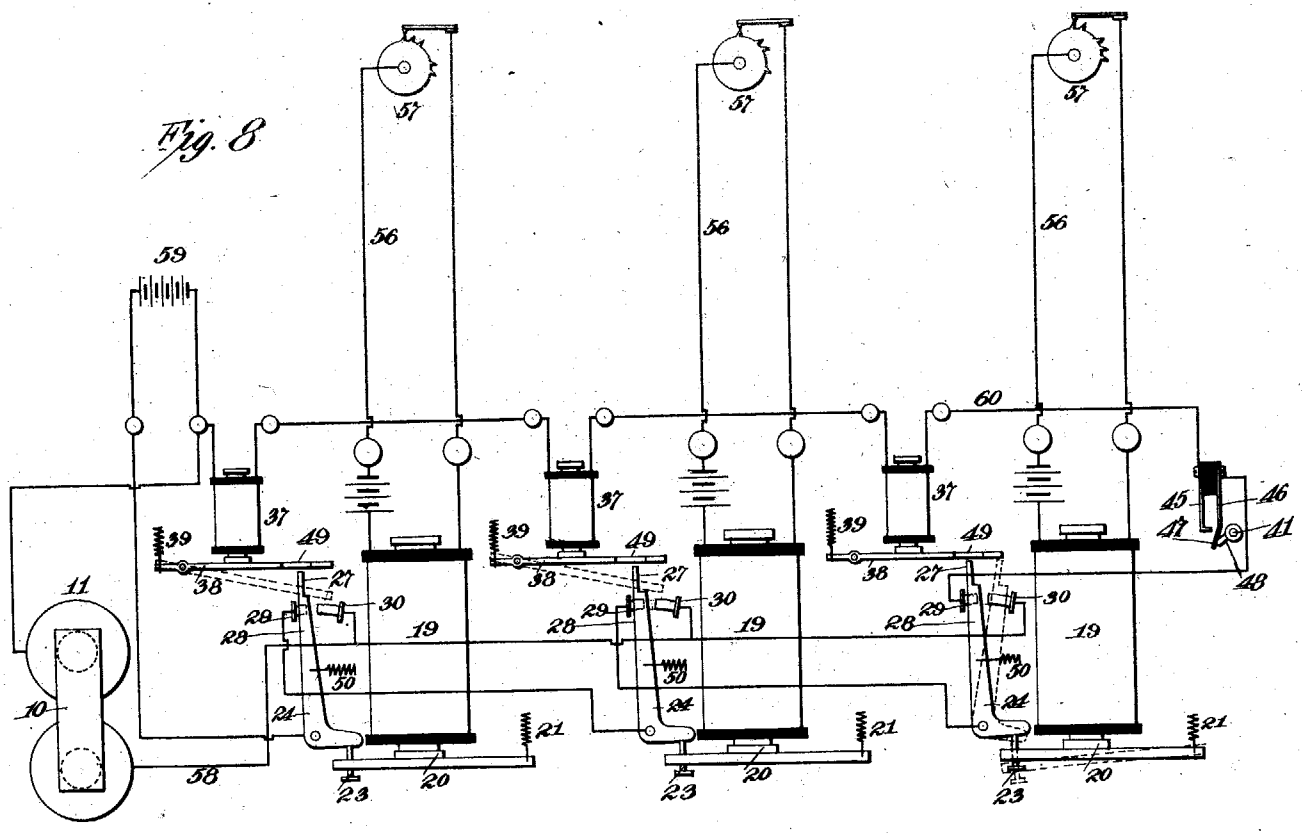

Mounted on the base of the apparatus are street-magnets 19, one for each street-circuit, the latter being normally closed, as shown in Fig. 8. The armatures 20 of the street-magnets are retracted by an adjustable spring 21 when any one of the street-magnets is deënergized, and their rearward movement is limited by a screw-stop 22. At the upper end of each armature-lever is a screw 23, which coöperates with one arm of a bell-crank 24, mounted on an insulating-block 25, carried on a rod 26, extending across the street-magnets. The other arm of each bell-crank is provided with a finger 27, which coöperates with a notch in the armature-lever of the corresponding non-interference magnet, as will be presently explained. Pivoted on the other side of each of the insulating-blocks 25 is a switch 28, normally engaging a contact 29, but adapted to engage a contact 30 when the switch is moved downwardly to the position shown in Fig. 6 and in dotted lines, Fig. 4. In the embodiment of my invention illustrated the armature, bell-crank, and switch, all actuated by the street-magnet, constitute what I may call for lack of a better term "a moving device," and this moving device is that which actually controls the repeating mechanism. The character of the moving device will depend upon the type and details of the entire apparatus and must necessarily be modified as occasion requires. The moving device has an attracted and a retracted position, which in the embodiment of my invention illustrated will be the normal and abnormal position, respectively, the normal position being that which the moving devices assume when they are not receiving or repeating a signal. This switch is provided with a slotted head, with which an insulated stud 31 on the corresponding bell-crank 24 engages. The restoring-shaft 18 carries the usual arm 32, which operates a lever 33 on a rock-shaft 34. Secured to this rock-shaft are a number of arms 35, corresponding to the street-magnets and provided with adjusting-screws 36, Fig. 4, which engage the armature-levers of said magnets to restore the same when the restoring-shaft makes the second half of its rotation. As will be presently explained, this mechanical restoration of the armatures of the street-magnets is necessary in case one or more of the street-circuits become disabled.

A number of non-interference magnets 37, corresponding with the street-magnets, are employed, one being located over each street-magnet. The armature-levers 38 of the non-interference magnets are adapted to be retracted by springs 39. Coöperating with each armature-lever 38 is an arm 40 on a rock-shaft 41, arranged in the normal position of the parts to hold the armatures of the non-interference magnets in contact with or closely adjacent to the poles thereof. An arm 42 is secured to the rock-shaft 41 and is connected by a link, as shown, with an arm 43, loosely pivoted on the rock-shaft 34 and operated by a cam 44 on the restoring-shaft 18. A pair of normally separated springs 45 46 are carried by an insulating-block, and the spring 46 is provided with an inclined or cam portion 47, with which an insulating-pin 48 on the rock-shaft 41 engages. The armature-lever 38 of each non-interference magnet is provided with a notch 49 in line with the finger 27 of the corresponding bell-crank 24. The parts are so proportioned that when any armature-lever of a non-interference magnet is moved to a retracted position (see dotted lines, Fig. 3) the finger 27 of the corresponding bell-crank will be projected through the notch to lock the particular bell-crank in question from movement by its spring 50. When, however, any one of the bell-cranks is moved, (see Fig. 6 and dotted lines, Fig. 4,) the finger 27 thereof will act as a stop for the armature-lever of the corresponding non-interference magnet and prevent the armature thereof from being moved out of the field of the particular non-interference magnet in question when the circuit thereto is closed.

The armature-lever of each street-magnet is provided near its upper end with a pin 51, which coöperates with a hook 52, carried at the end of an arm 53, pivoted to a stationary bracket 54. A leaf-spring 55 engages the top of the arm 53 and holds it in its normal position. As shown in Fig. 7, the hook 52 overhangs the shank thereof, so that the pin 51 on the corresponding armature-lever will when the armature-lever is retracted pass beneath the hook (see *b*, Fig. 7) to slightly elevate the pivoted arm 53, while upon the restoration of said armature-lever the pin rides up on the top of the hook (see *c*, Fig. 7) to depress said arm. The parts are so adjusted that the restoring-shaft 18 moves the armature-levers only to a sufficient extent to engage the several pins 51 with the hooks 52 (see *d*, Fig. 7) and does not move the armature-levers to their complete attracted position, (see *a*, Fig. 7,) in which the pins are brought completely to the rear of said hooks. This latter movement of the armature-levers is effected by the attraction of the street-magnets themselves, and in the event of a break in the street-circuit the corresponding armature-lever will remain hooked in an almost completely retracted position, as will be obvious. In this position—namely, with the pin 51 in engagement with the hook 52, as shown at *d*, Fig. 7—the switch 28 will be maintained in engagement with the upper contact-plate 29 therefor, so that notwithstanding the disabling of any street-circuit the street-magnet will not affect the non-interference circuit.

The preferable electrical connections are shown in Fig. 8, in which for the purpose of diagrammatic illustration the switches 28 and bell-cranks 24 are shown as a single element. The street-magnets 19 are in closed street-circuits 56, each containing one or more street-boxes 57. The main operating-magnet 11 is in a normally open local circuit 58, including a local battery 59, which local circuit is adapted to be closed at any one of the contacts 30 by the operation of the corresponding switch 28. The several non-interference magnets 37 are connected in series in a local circuit 60, which includes the contact-springs 45 and 46 and the contacts 29, with which the switches 28 are normally in circuit. The local circuit 60 for the non-interference magnets is normally broken at the springs 45 and 46. When, however, the repeating mechanism starts to operate, the circuit to the non-interference magnets will be closed, and the subsequent operation of the non-interference mechanism will therefore be the same as if a normally closed local circuit were used. By adopting this expedient I am therefore enabled to operate the non-interference mechanism on a practically closed local circuit without, however, draining the local battery when the device is not in operation.

Assuming a signal to be sent in over one of the street-circuits and without any interference from other street-circuits, the operation of the apparatus is as follows: When one of the street-circuits is broken, its armature-lever is retracted by the spring 21 to the position shown in dotted lines, Fig. 4. This movement permits the spring 50 to operate the corresponding bell-crank 24, which moves the switch 28 into engagement with the contact-plate 30. The local circuit 58 is therefore closed on the main operating-magnet 11 through the several levers 28 and contacts 29 attracting the armature 10, elevating the lever 7, releasing the arm 5, and permitting the circuit-breaking cylinder 1 to make almost a complete rotation, breaking and again reëstablishing the circuits 3 to the several engine-houses. When the street-circuit is again closed, the armature thereof will be attracted, moving the bell-crank 24 to its normal position and again engaging the switch 28 with the contact 29, thereby breaking the local circuit 58 at this point, permitting the lever 7 to move to its normal position and engaging the pin on the lower end of the arm 5 with the stud 6, thus bringing the contact-breaking cylinder 1 to its normal position. Each break in the street-circuit will result in a repetition of these operations to successively break and reëstablish the circuits 3 to the several engine-houses. The movement of the shaft of the cylinder 1 operates the cam 12 to elevate the trip-lever 13 to thereby trip the shaft 18 and permit it to make a half-rotation. In this movement of the restoring-shaft 18 the cam 44 will be retracted from the arm 43 to release the rock-shaft 41. As soon as this rock-shaft is released all of the armature-levers of the non-interference magnets except that corresponding to the street-magnet in operation will be retracted by the springs 39 and moved to the position shown in dotted lines, Fig. 3, to engage the notches 49 over the fingers 27 and prevent the operation of the corresponding switches 28. In this position the armature-levers of the non-interference magnets are out of the influence of those magnets, so that a closing of the non-interference circuit will not affect the retracted armatures. It will be obvious that the armature-lever of the non-interference magnet corresponding to the street-magnet in operation will not be retracted like the armature-levers of the other non-interference magnets, since the finger 27 of the street-magnet in operation will occupy the position shown in dotted lines, Fig. 4, to block the armature-lever of the non-interference magnet and prevent it from being retracted. The movement of the rock-shaft 41 referred to engages the insulating-finger 48 with the spring 46 to close the non-interference circuit at this point; but the non-interference circuit will be broken at the contact 29 of the street-magnet in operation, so that the armature-lever thereof is held from moving to a retracted position entirely by mechanical means—namely, the engagement of the finger 27 therewith. When the street-circuit is again restored to attract the armature 20, moving the bell-crank 24 to its normal position again in line with the notch 49 of the non-interference magnet, the armature-lever of the non-interference magnet in question will be still held in an attracted position, since the non-interference circuit will be closed by the reëngagement of the switch 28 with the contact-plate 29.

From what has been said it will be seen with respect to the armature-lever of any one of the non-interference magnets that said armature-lever is during the operation of its particular street-magnet maintained in an attracted position, first mechanically and then magnetically—*i. e.*, when the street-magnet is deënergized to close the local circuit 58 the armature-lever will be mechanically held in an attracted position by the engagement of the finger 27 therewith, and when the street-circuit is closed to break the local circuit 58 by the movement of the switch 28 from engagement with the contact 30 to the contact 29 the circuit 60 will be closed through the switch 28 and contacts 29 to energize all of the non-interference magnets to magnetically attract the armature-lever in question. Thus the armature-lever of the non-interference magnet corresponding to the street-magnet in operation is prevented from interfering in any way with the operation of the switch corresponding thereto to close the circuit 58 on the main operating-magnet 11. In the case of the other non-interference magnets, however, their armatures being in the position shown in dotted lines, Fig. 3, lock the bell-cranks 24 of all the other street-magnets, so that if a signal is transmitted over any other street-circuit except that which commenced to first operate it results only in the movement of the armature-levers without effecting a movement of the corresponding switches to actuate the magnet 11, controlling the operation of the repeater. In this way by arranging the parts so that the operation of any one of the armatures of the street-magnets will be immediately followed by a retraction of the armature-levers of the non-interference magnets for all the other street-magnets to thereby lock the switches controlled by such other street-magnets to prevent the latter from controlling the repeating mechanism I effectively prevent interference, as will be evident, it being understood, of course, that the armature-lever of the non-interference magnet for the street-magnet in operation is held mechanically and electrically in an attracted position, so as not to interfere with the operation of the switch 28 for the particular magnet in question, as explained. After the signal has been sent in the trip-lever 13 will regain its normal position to trip the shaft 18 and allow the latter to make a half-rotation to regain its normal position. In this movement the arm 32 engages with the lever 33 and moves it in the direction of the magnets to move the armatures almost to their complete attracted position or, in other words, to move the armatures to the position where the pin 51 engages over the hook 52. (See *d*, Fig. 7.) The shaft 18 completes its half movement, which will cause the arm 32 to swing past the end of the lever 33, permitting it to be returned to its original position by the action of its controlling-spring. This movement of the rock-shaft also causes the cam 44 to move the arms 43 and 42 to swing the rock-shaft 41, returning the retracted armature-levers of the non-interference magnets to their attracted position and holding them in that position (see Fig. 3) ready for a new operation. This movement of the rock-shaft 41 also draws the finger 48 from the spring 46 to break the non-interference circuit at that point.

My improved non-interference mechanism is so perfect in its operation that it prevents interference between signals received on different street-circuits, even when the first signal is received simultaneously on a number of circuits. This will be understood from a consideration of the diagram shown in Fig. 8, in which the signal transmitted over the street-circuit at the right is "two-three" and that over the street-circuit at the left is "three-two." The wheels of the boxes of both of these circuits having the same number of "makes" and "breaks" in each revolution will turn at the same speed. Assuming that these two boxes are pulled simultaneously, the corresponding street-magnets will be simultaneously deënergized, releasing both armature-levers and closing the circuit 58 at each magnet. The fingers 27 for both of these magnets will engage in front of the armature-levers of two corresponding non-interference magnets, and said non-interference magnets will therefore be prevented from disabling the two street-magnets in operation. The movement of the switches 28 will break the non-interference circuit 60, and the armature-lever of the central non-interference magnet will therefore move to its retracted position to lock the street-magnet, as shown in dotted lines in the middle of Fig. 8, to disable the same. In sending the second signal over the two outside street-circuits both of the magnets will operate simultaneously and neither will be disabled by its non-interference magnet. The third signal is received only on the left-hand street-circuit and results in demagnetizing the corresponding street-magnet 19, so as to break the non-interference circuit 60 between the contact 29 and the switch 28 therefor. Owing to the prolonged interval between the second and third breaks of the right-hand street-circuit, that circuit will remain open while the circuit on the left-hand side is being broken to send the third break of the "three" signal on that side. The street-magnet on the left-hand side will therefore be energized before the street-magnet on the right-hand side is and the left-hand armature will be the first attracted. This will cause the switch 28 to resume the position shown on the left of Fig. 8; but the non-interference circuit 60 being broken the non-interference armature 38 will drop downward to the position shown in broken lines to the left of that figure, thus causing the finger 27 to engage below the notch in the non-interference armature, which will disable the left-hand street-magnet. The circuit 58 being broken at the right, owing to the retracted position of the right-hand street-magnet, the "third" signal made in the left-hand circuit will not be repeated. After the interval between the second and third break in the right-hand street-circuit has elapsed this circuit is again completed, the street-magnet on that side will be energized, and its armature attracted, thus completing the circuit 58 and repeating this signal. The switch 28 will be moved from the position shown in dotted lines to that shown in full lines to the right of Fig. 8, thus completing the non-interference circuit 60 at that point and energizing all of the non-interference magnets 37, which will prevent the armature 38 on the right-hand side from being retracted and will not lock the switch 28 on that side, it being understood that the switch 28 will engage with the contact 29 before the finger 27 reaches the notch 49. All of the other non-interference armatures will be in the retracted position shown in dotted lines and will be too far removed from their magnets to be affected thereby on the completion of the circuit 60. The street-magnet 19 on the right-hand side will therefore continue to be energized and deënergized until the complete signal has been sent. Consequently the further signals will be transmitted by the street-magnet at the right and no interference from the others will be permitted. In this way it will be obvious that whenever two signals are received at the same time on more than one of the street-magnets all of the street-magnets receiving the signal will operate in unison, all the others being disabled. As soon, however, as one of the street-magnets receives the signal in advance of the others it will be disabled and the one last receiving the signal will continue to operate until its entire signal has been received. Thus it becomes possible to effectively operate the device without interference, even when a portion of the signals are received at the same instant by a plurality of the street-magnets.

In the event of one of the street-circuits becoming disabled, as by a break or ground therein, it will be seen that unless such a contingency were provided for the release of the corresponding street-magnet armature would send a single impulse over the circuits 3 and permit the switch 28 thereof to remain in engagement with the contact-plate 30 to thereby keep the circuit 58 closed on the magnet 11.

This would obviously prevent the other street-magnets from affecting that circuit. By providing the street-magnet armatures with pins 51, coöperating with hooks 52, as explained, this difficulty is overcome, since the operation of the restoring-shaft 18 will carry the pin into engagement with the hook (see *d*, Fig. 7) to hold the switch of the magnet in question in engagement with the contact 29, breaking the circuit 58 at the contact 30. Thus in the event of one of the street-circuits becoming disabled after its magnet 19 has once operated the controlling-magnet 11 its armature will be restored until its pin 51 engages the corresponding hook 52, and the armature will then remain in that position, so as not to interfere in any way with the operation of the magnets of the other street-circuits. As soon as the disabled street-circuit has been repaired and the circuit is once again closed its street-magnet will attract its armature and move the pin 51 from the position shown at *d*, Fig. 7, to the normal retracted position, as shown at *a*, Fig. 7.

Having now described my invention, what I claim as new, and desire to secure by Letters Patent, is as follows:

1. In a non-interference repeater for fire-alarm circuits, the combination with repeating mechanism and a plurality of street-magnets controlling the same, of a normally open circuit embracing non-interference magnets corresponding with the street-magnets, means controlled by the non-interference magnets for preventing the operation of the repeating mechanism by any one of the street-magnets while under the control of any other of the street-magnets, and means actuated by the operation of the repeating mechanism for closing the non-interference circuit, substantially as and for the purposes set forth.

2. In a non-interference repeater for fire-alarm circuits, the combination with repeating mechanism, of a plurality of switches controlling the same, a corresponding number of street-magnets for actuating said switches, a normally open circuit embracing non-interference magnets corresponding with the street-magnets, means controlled by the non-interference magnets for disabling the switches except that of the street-magnet first receiving a signal, and means actuated by the operation of the repeating mechanism for closing the non-interference circuit, substantially as and for the purposes set forth.

3. In a non-interference repeater for fire-alarm circuits, the combination with repeating mechanism, of a plurality of street-magnets, operating-switches for controlling said mechanism, a normally open circuit embracing non-interference magnets corresponding with the street-magnets, means controlled by each of the street-magnets for operating the non-interference magnets to disable the switches except that of the street-magnet first receiving a signal and prevent any other street-magnet from controlling the repeating mechanism, and means actuated by the operation of the repeating mechanism for closing the non-interference circuit, substantially as and for the purposes set forth.

4. In a non-interference repeater for fire-alarm circuits, the combination with repeating mechanism, of a plurality of street-magnets, a switch operated by each street-magnet controlling the repeating mechanism, a plurality of non-interference magnets, and armature-levers for the non-interference magnets coöperating with said switches, the said armature-levers having slots therein, substantially as and for the purposes set forth.

5. In a non-interference repeater for fire-alarm circuits, the combination with repeating mechanism, of a plurality of switches controlling the same, corresponding street-magnets actuated by said switches, a normally open circuit embracing non-interference magnets corresponding with the street-magnets, means controlled by the non-interference magnets for disabling the switches of all the street-magnets except the first street-magnet to operate, and means controlled by the repeating mechanism for closing the circuit including the non-interference magnets, substantially as and for the purposes set forth.

6. In a non-interference repeater for fire-alarm circuits, the combination with repeating mechanism, of a plurality of switches controlling the same, a street-magnet for each switch, a non-interference magnet for each street-magnet, an armature-lever for each non-interference magnet having a cut-away portion therein coöperating with the respective switch therefor, and means controlled by the repeating mechanism for permitting the armature-levers of the non-interference magnets to move to a retracted position, substantially as and for the purposes set forth.

7. In a non-interference repeater for fire-alarm circuits, the combination with repeating mechanism, of a plurality of switches controlling the same, a street-magnet for each switch, a non-interference magnet for each street-magnet, an armature-lever for each non-interference magnet having a cut-away portion therein coöperating with the respective switch therefor, means controlled by the repeating mechanism for permitting the armature-levers of the non-interference magnets to move to a retracted position, and means operated by the repeating mechanism for closing the non-interference circuit, substantially as and for the purposes set forth.

8. In a non-interference repeater for fire-alarm circuits, the combination with repeating mechanism, of a plurality of street-magnets controlling the same, a normally open circuit embracing non-interference magnets corresponding with the street-magnets, means controlled by the repeating mechanism and cooperating with the non-interference magnets for disabling all the street-magnets except that immediately controlling the repeating mechanism, and means actuated by the operation of the repeating mechanism for closing the non-interference circuit, substantially as and for the purposes set forth.

9. In a non-interference repeater for fire-alarm circuits, the combination with repeating mechanism, of a street-magnet, a switch controlling the repeating mechanism, connections between said switch and the armature of the street-magnet, a non-interference magnet, and an armature therefor having a slot therein adapted to engage with said switch, substantially as and for the purposes set forth.

10. In a non-interference repeater for fire-alarm circuits, the combination with repeating mechanism, of a street-magnet, a switch controlling the repeating mechanism, connections between said switch and the armature of the street-magnet, a non-interference magnet, an armature therefor having a slot therein adapted to engage with said switch, and means controlled by the repeating mechanism for mechanically releasing said armature, substantially as and for the purposes set forth.

11. In a non-interference repeater for fire-alarm circuits, the combination with repeating mechanism, of a street-magnet, a switch controlling the repeating mechanism, connections between said switch and the armature of the street-magnet, a non-interference magnet, an armature therefor having a slot therein adapted to engage with said switch, means controlled by the repeating mechanism for mechanically releasing said armature, and means operated by the switch for closing the circuit to the non-interference magnet concurrently with the operation of the repeating mechanism, substantially as and for the purposes set forth.

12. In a non-interference repeater for fire-alarm circuits, the combination with repeating mechanism, of a street-magnet, a switch controlling the repeating mechanism, connections between said switch and the armature of the street-magnet, a non-interference magnet, an armature therefor having a slot therein adapted to engage with said switch, means controlled by the repeating mechanism for mechanically releasing said armature, means operated by the switch for closing the circuit to the non-interference magnet concurrently with the operation of the repeating mechanism, and a secondary circuit-closing device in the non-interference circuit controlled by the repeating mechanism, substantially as and for the purposes set forth.

13. In a non-interference repeater for fire-alarm circuits, the combination with repeating mechanism and a restoring-shaft operated thereby, of a street-magnet, a switch operated by the street-magnet for effecting the operation of the repeating mechanism, a non-interference magnet, an armature-lever therefor having a slot therein adapted to engage with said switch, and connections between the restoring-shaft and the armature-lever of the non-interference magnet for mechanically releasing said armature-lever concurrently with the operation of the repeating mechanism, substantially as and for the purposes set forth.

14. In a non-interference repeater for fire-alarm circuits, the combination with repeating mechanism and a restoring-shaft operated thereby, of a street-magnet, a switch operated by the street-magnet for effecting the operation of the repeating mechanism, a non-interference magnet, an armature-lever therefor having a slot therein adapted to engage with said switch, connections between the restoring-shaft and the armature-lever of the non-interference magnet for mechanically releasing said armature-lever concurrently with the operation of the repeating mechanism, a switch in the non-interference circuit, and connections between said switch and restoring-shaft for closing the non-interference circuit, substantially as and for the purposes set forth.

15. In a non-interference repeater for fire-alarm circuits, the combination with repeating mechanism, of a street-magnet, an armature therefor, a bell-crank actuated by said armature, a switch operated by the bell-crank for controlling the repeating mechanism, and a non-interference magnet and armature coöperating with the bell-crank, substantially as and for the purposes set forth.

16. In a non-interference repeater for fire-alarm circuits, the combination with repeating mechanism, of a street-magnet controlling the same, an armature for said street-magnet, a pin on said armature, a hook for receiving the pin when the armature is partially attracted, and means controlled by the repeating mechanism for mechanically engaging said pin with said hook, substantially as and for the purposes set forth.

17. In a non-interference repeater for fire-alarm circuits, the combination with a series of street-circuits each embracing a magnet and a moving device which controls means for repeating the signal, a lock for each moving device, the lock being controlled by that moving device which is in the retracted position after a plurality of the moving devices have been simultaneously operated and have ceased to move in unison, to lock out and render inoperative all of the other moving devices, whereby the signal of the circuit in control will be continued to be sent without mutilation, substantially as and for the purposes set forth.

18. In a non-interference repeater for fire-alarm circuits, the combination with a series of street-circuits, each embracing a magnet and a moving device which controls means for repeating the signal, a lock for each moving device, the lock being controlled by that moving device which is in the abnormal position after a plurality of the moving devices have been simultaneously operated and have ceased to move in unison, to lock out and render inoperative all of the other moving devices, whereby the signal of the circuit in control will be continued to be sent without mutilation, substantially as and for the purposes set forth.

19. In a non-interference repeater for fire-alarm circuits, the combination with a repeating-train and a plurality of street-circuits, each embracing a magnet and a moving device actuated thereby, means actuated by any one of the moving devices for starting the repeating-train, means controlled by that moving device which is in retracted position after a plurality of the moving devices have been simultaneously operated and have ceased to move in unison, to prevent action of the other moving devices on the repeating-train, whereby the signal of the circuit in control will be continued to be sent without mutilation, substantially as and for the purposes set forth.

20. In a non-interference repeater for fire-alarm circuits, the combination with a repeating-train, and a plurality of street-circuits, each embracing a magnet and a moving device actuated thereby, means controlled by any one of the moving devices for starting the repeating-train, a lock for each moving device, the lock being controlled by one of the moving devices when a plurality of the moving devices have been simultaneously operated, and cease to move in unison, to lock out and render inoperative all of the moving devices except the one which first gets control, whereby the signal of the circuit in control will be continued to be repeated without mutilation, substantially as set forth.

21. In a non-interference repeater for fire-alarm circuits, the combination with a plurality of circuits, each including a street-magnet, and a repeating mechanism which comprises moving contact devices and a timing device, of moving devices actuated by the street-magnets, each of said moving devices being capable of movement from an operative to an inoperative position and vice versa, and by such movement actuating the repeating mechanism and the timing device, a locking-out device for each moving device, means for bringing the locking-out devices into action by the movement of a moving device from the inoperative to the operative position, when a plurality of such moving devices have been simultaneously operated and cease to operate in unison, which moving device will control all of the other locking-out devices and lock out all of such moving devices as are in the inoperative position and prevent movement of these moving devices so long as the timing device is operating, substantially as and for the purposes set forth.

This specification executed the 30th day of April, 1904.

WILLIAM H. KIRNAN.

Witnesses:

CHAS. W. CORNELL,

L. E. LOWRY.